N. JONES,

Assignor of one-fourth interest to H. G. BELL.

Truss-Pads.

No. 8,623. Reissued Mar. 11, 1879.

Witnesses:

P. C. Dieterich.

Frank H. Duffy

Inventor:

Nathaniel Jones.

Per C. H. Walson & Co. Attorneys.

N. PETERS, PHOTO-LITHOGRAPHER, WASHINGTON, D. C.

UNITED STATES PATENT OFFICE.

NATHANIEL JONES, OF SYRACUSE, NEW YORK, ASSIGNOR OF ONE-FOURTH INTEREST TO HENRY G. BELL.

IMPROVEMENT IN TRUSS-PADS.

Specification forming part of Letters Patent No. 136,735, dated March 11, 1873; Reissue No. 8,623, dated March 11, 1879; application filed December 4, 1878.

*To all whom it may concern:*

Be it known that I, NATHANIEL JONES, of Syracuse, in the county of Onondaga and State of New York, have invented certain new and useful Improvements in Truss-Pads; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Truss plates and pads have been made of metal and other substances, of varied shapes, to suit the position where the same are to be applied.

The object of my present invention is to produce a truss plate or pad which is adapted to rest directly upon the surface of the body without any injurious or unpleasant action, such as that resulting from the sulphur in hard rubber, and which is of a material that can be softened by a moderate degree of heat sufficiently to be pressed or molded or bent to the shape that is most convenient for and comfortable to the rupture and surface to which it is to be applied.

I employ the substance known as "solid collodion or pyroxyline," the same being prepared in any known or suitable manner, and regardless of the name by which it is called. This material has been used for dental purposes. It may be pierced with numerous small holes or left plain; and reference to plates and pads, perforated or pierced, is hereby made to Letters Patent Nos. 119,233, 127,889, and 127,890, as representing truss pads and plates; but I do not confine myself to the peculiar shapes of these pads and plates, or the manner in which they are made, or the manner in which they are held in position on the body; but the shapes of the pads and plates are to be such as to accommodate in any manner the hernia to which they are to be applied, and to be held in position upon the body in any desired or convenient manner either by flexible or metallic devices.

Truss plates and pads made of the aforesaid material can be heated sufficiently so as to be molded, pressed, or bent into the shape best adapted to fit the hernia and surface of the body to which they have to be applied. These truss pads and plates are much lighter than metal, and are free from the objections arising from the use of india-rubber or its compounds—from sulphur contained therein.

Figure 1:
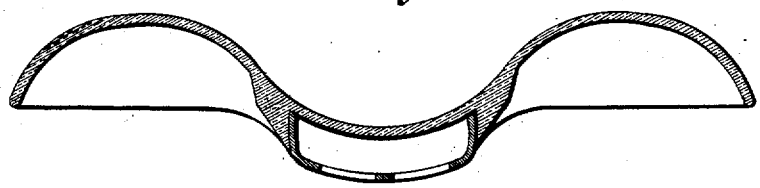
Figure 2:
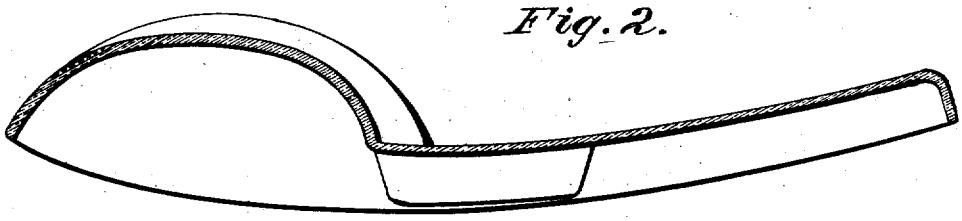
Figure 3:
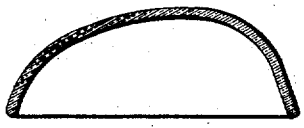

In the drawings, Figure 1 is a sectional plan of the plate, shown with two end pressers. Fig. 2 is a similar view, showing the plate with one presser. Fig. 3 shows a separate pad.

The pads and plates may be made separately, and used separately or together, and of whatever shape required for the various uses for hernial purposes, and are made of the aforesaid material, and pressed or bent into shape when sufficiently heated.

The figures illustrate a truss plate and pad; but the shape may be varied in any desired manner to suit the parts to which they are to be applied.

Having thus fully described my invention, what I claim as new, and desire to secure by Letters Patent, is—

A truss plate or pad composed of the substance known as "pyroxyline," or equivalent material, substantially as and for the purpose set forth.

In testimony that I claim the foregoing I have hereunto set my hand.

NATHANIEL JONES.

Witnesses:

J. H. LYBOULT,

ROBT. H. ABBOTT.